June 30, 1959  DE WITTE NELSON  2,892,721
SYNTHETIC BUTTERFAT AND PROCESS OF MAKING SAME
Filed March 12, 1954

INVENTOR.
De Witte Nelson
BY
R.G. Story
ATTORNEY

United States Patent Office 2,892,721
Patented June 30, 1959

2,892,721
SYNTHETIC BUTTERFAT AND PROCESS OF MAKING SAME

De Witte Nelson, Elmhurst, Ill., assignor to Swift & Company, Chicago, Ill., a corporation of Illinois Application March 12, 1954, Serial No. 415,720

7 Claims. (Cl. 99—118)

The present invention in general relates to interesterification of lard and coconut oil. More specifically, the interesterification of the present invention relates to a random redistribution of the fatty glycerides of lard and coconut oil to give a product having properties similar to natural butter and to other improved interesterification products of lard and coconut oil useful as a butterfat substitute.

Butterfat is the most valuable fat or oil in common use. In many instances the quality of a product is judged according to its butterfat content. For this reason, a material that duplicates the characteristics of butterfat and is produced from relatively inexpensive ingredients would have great commercial utility in preparing foods such as frozen desserts, margarine, processed cheese, coating fats for cookies and candies, etc. Although many attempts have been made to devise methods of synthesizing butterfat, no such process has met with any appreciable success. Very often the fat did not have a plastic range similar to butter. A number of the materials were gummy and left an undesirable taste in the mouth. The keeping qualities of such products also failed to come up to commercial standards.

It is therefore an object of this invention to provide a synthetic product having similar characteristics to those of butterfat.

A further object is to provide a method for producing a substitute for butterfat.

An additional object of this invention is to provide a method for producing an interesterified product of lard and coconut oil, which product closely simulates the characteristics of natural butterfat.

Additional objects not herein enumerated will be apparent to one skilled in the art from the following detailed description.

Generally, the present invention comprises an interesterification product of lard and a coconut oil. By reacting a mixture of lard and coconut oil at about 100° C. in the presence of a small amount of sodium methylate as a catalyst, an ester interchange and redistribution of the fatty acid radicals among the different glyceride molecules yields a product having a marked change from the uninteresterified mixture. By selecting an appropriate ratio of lard to coconut oil, the resulting product can be controlled so that it has chemical and physical properties virtually identical to butter. Further experimentation has shown that other mixtures of lard and coconut oil, varying somewhat from the optimum ratio of lard to coconut oil, also serve as good substitutes for butterfat in a variety of food products.

Figure 1:
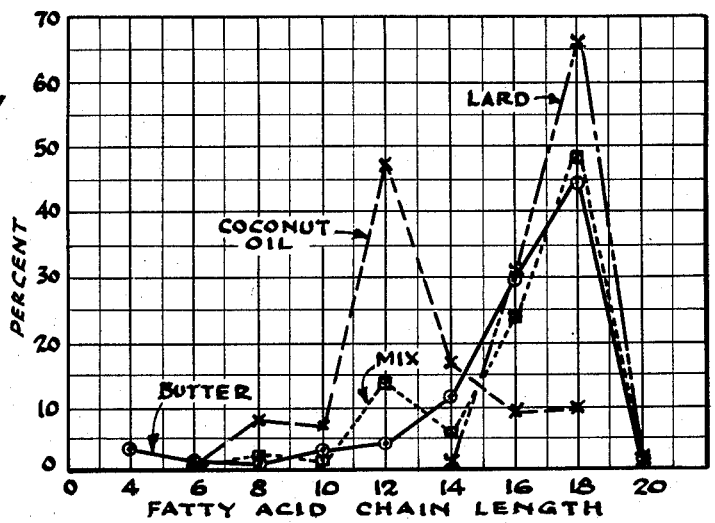
Figure 1 represents a graph illustrating the percentage of the various fatty acid radicals in terms of chain length of the glycerides of butter, lard, coconut oil and an interesterified mixture of lard and coconut oil.
Figure 2:
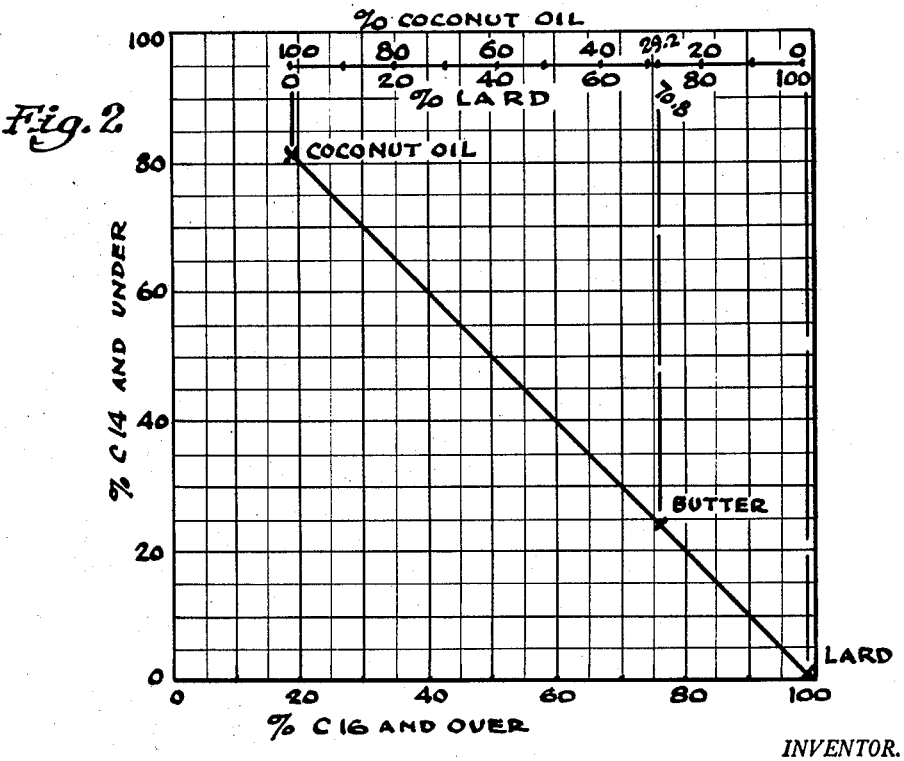
Figure 2 represents a graph which illustrates the manner of determining the optimum mixture of lard and coconut oil in order that the interesterified mixture will have a chemical composition similar to that of butterfat.

By adopting the procedure illustrated in Figures 1 and 2 the proper selection of a mixture of lard and a coconut oil may be obtained for producing a product similar to natural butter. As is illustrated in Figure 2, the esters of lard have about 99% fatty acid radicals of a carbon chain length of 16 and over. The sixteen and eighteen carbon acids largely predominate in this latter group. On the other hand, many vegetable oils predominate in fatty acids of a chain length less than 16, as is illustrated by the graph of coconut oil in Figure 1. Hence, by choosing the sixteen carbon length as a dividing point, plotting the percentage compositions of lard and coconut oil in terms of chain lengths of 16 and over against the chain lengths of 14 and under, and connecting the two plotted points by a straight line, the amount of each constituent necessary to produce synthetic butter can be determined by the following procedure.

The horizontal distance between the points marked on the graph for lard and coconut oil is divided into equal segments of increments divisible into 100%, for example, increments of 10%. These increments denote the percentage of lard, reading from left to right, and coconut oil, reading from right to left, as illustrated in Figure 2. By locating the point for butter in terms of its percentage of fatty acids on the diagonal line of Figure 2, the optimum mixture of lard and coconut oil may be determined by drawing a vertical line from the point denoting butter to the percentage line at the top of Figure 2.

After the determination of the optimum percentage for the mixture of lard and coconut oil, the percentage of the various lengths of the fatty acid chains in the mixture is plotted as shown in Figure 1 to compare it with the chemical composition of butter. If the graph of the mixture closely proximates the graph of butter, as does a mixture of lard and coconut oil, the mixture is a good one for interesterification to produce a substitute butterfat.

Following the determination of the proper mixture of lard and coconut oil, it is necessary to interesterify the mixture in order to obtain a product having properties similar to butter. Interesterification is an interchange and redistribution of the fatty acid radicals of the glycerides of the coconut oil and lard to produce a uniformity of crystalline structure of the resulting product. Less than 0.25% catalyst may be used but this results in an increased time of reaction.

The preferred catalyst for effecting interesterification is sodium methylate. Other alcoholates of sodium or potassium are effective as are other interesterification catalysts such as finely dispersed metallic sodium, sodium amide and tin salts. About 0.25% catalyst is generally sufficient although greater amounts may be used to increase the rate of reaction. However, smaller amounts may also be used, but the employment of smaller amounts results in an increased time of reaction. While it is preferable to stir the mixture during the reaction, it will proceed without stirring. After the fat is treated, the catalyst must be deactivated before the fat can be cooled to avoid disturbance of the equilibrium attained. This may be accomplished by mixing the fat with an acidic material, e.g., dilute phosphoric or glacial acetic acid, or by spraying the mixture with water.

It is often advantageous to slightly hydrogenate the interesterified product to improve its stability. A slight hydrogenation of an interesterification product of coconut oil and lard has been found beneficial to its stability.

Further experimentations with percentage mixtures other than the optimum 71% lard and 29% coconut oil mixture yielded good substitutes for butterfat in food products such as frozen desserts, substitutes for whipped cream, margarine, "filled cheese," process cheese, and coating fat for cookies and candies. A range from 50% lard and 50% coconut oil to 75% lard and 25% coconut oil may be employed to produce economical substitutes for butterfat in a wide variety of food products.

Interesterified mixtures within the above range exhibit properties desirable in many food products. The X-ray diffraction pattern shows a beta-prime crystal pattern which has improved resistance to deterioration of the physical appearance and textural properties of the fat over the beta form of untreated lard and some vegetable oils. Some mixtures have a short plastic range similar to butter. The product does not have the gumminess and undesirable flavors of other butter-fat substitutes, and the absence of any tendency to coat the roof of the mouth makes the substitute desirable for many food products. This latter characteristic is often denoted as a good "get away" characteristic.

The following examples illustrate various percentage mixtures of interesterified lard and coconut oil and the desirable characteristics of the products as butter substitutes in a variety of food products:

EXAMPLE I

A 50% lard and 50% coconut oil mixture was interesterified at 100° C., using 0.5% sodium methylate as a catalyst. The resultant product interesterified for one hour produced a fat having a sharp melting point. As is noted below, the softening point was 84° F. and the melting point 85° F., a difference of one degree.

| No. | Interesterified, Min. at 100° C. | S.P. (° F.) | M.P. (° F.) | Cloud (° F.) | Stir Down [1] (° C.) |
|---|---|---|---|---|---|
| 1 | 0 | 79 | 98 | 76 | 7.8-14.8 |
| 2 | 30 | 82 | 86 | 68 | 8.4-14.2 |
| 3 | 60 | 84 | 85 | 68 | 9.8-14.6 |

[1] Temperatures before and after "kickback" occurring when sample is chilled in titer tube while stirring rapidly with a titer thermometer starting with a melted sample and immersing the tube in an ice water bath held at 0-1° C.

EXAMPLE II

A mixture of 75% lard and 25% coconut oil was interesterified by heating the thoroughly dried oil at 100° C. in the presence of 0.5% sodium methylate acting as an interesterification catalyst for a total of four hours. Samples were withdrawn hourly and refined and analyzed as follows:

| Hours of treatment | Softening Point (° F.) | Melting Point (° F.) | Cloud Point (° F.) | Stir Downs [1] (° C.) |
|---|---|---|---|---|
| Original Mix: | | | | |
| 0 hours | 82 | 105 | 82 | 7.6-12.2 |
| 1 hour | 86 | 89 | 72 | 5.4- 9.2 |
| 2 hours | 83 | 88 | 70 | |
| 3 hours | 86 | 90 | 76 | 5.8-10.2 |
| 4 hours | 88 | 90 | 78 | 6.0-11.0 |

[1] Temperatures before and after "kickback" occurring when sample is chilled in titer tube while stirring rapidly with a titer thermometer starting with a melted sample and immersing the tube in an ice water bath held at 0 to 1° C.

Analyses show that the greatest changes took place in the first hour. They also show that unlike lard the Stir Down does not vary appreciably throughout the entire process. Particular attention is directed toward the small spread between the softening point (88° F.) and the melting point (90° F.) of the final product.

A portion of the final four-hour chilled sample from the Stir Down test was allowed to temper at 75° F. for several days. An X-ray diffraction picture of this fat shows development of typical beta-prime crystal pattern.

2000 grams of the final product was hydrogenated under 30 lbs. hydrogen pressure at 200° C. in the presence of about 0.3% of finely divided nickel catalyst, and the butyro refractive index was reduced from 35.2 to 28.3. The nickel catalyst was removed from the hydrogenated oil which was then analyzed:

Softening point _____ ° F __ 128
Melting point _____ ° F __ 134
Iodine No. _____ 0.8
Titer _____ ° C __ 55.9

The above fat crystallized in the beta prime X-ray pattern similar to that of fully hydrogenated cottonseed oil and dissimilar to the beta pattern of fully hydrogenated lard or soybean oil or peanut oil. It was also observed that the fat after slow cooling tends to shrink away from the container. A similar tendency has been noted with fully hydrogenated cottonseed oil. This is in contrast to the phenomena of eruption at the surface of slowly cooled, fully hydrogenated soybean oil, lard or peanut oil.

When used as a plasticizer, it produced a shortening with desirable baking properties. Three hundred grams of this hard fat were melted and mixed with 1700 grams of crystal modified lard of the type described in U.S. Patents Nos. 2,625,478-2,625,487. The mixture was then chilled in a small ice cream freezer. After tempering 24 hours at 75° F., the shortening was used in baking a pound cake. The batter had a specific gravity of .700 and the baked cake a volume of 1485 cc. In a Wet Cream test, the specific gravity was found to be 0.545.

EXAMPLE III

Mixtures of lard and coconut oil in 10% increments were interesterified under the conditions described in Example I and analyzed as follows:

| Percent Mixture | | S.P. (° F.) | M.P. (° F.) | Cloud (° F.) |
|---|---|---|---|---|
| Lard | Coconut | | | |
| 100 | 0 | 93 | 104 | 88 |
| 90 | 10 | 93 | 99 | 80 |
| 80 | 20 | 91 | 96 | 74 |
| 70 | 30 | 84 | 90 | 74 |
| 60 | 40 | 83 | 87 | 70 |
| 50 | 50 | 80 | 84 | 64 |
| 40 | 60 | 79 | 83 | 62 |
| 30 | 70 | 78 | 82 | 62 |
| 20 | 80 | 77 | 80 | 62 |
| 10 | 90 | 76 | 80 | 62 |
| 0 | 100 | 76 | 80 | 62 |

As may be noted by the data above, the interesterification product of lard and coconut oil is a product having a difference between the softening point and the melting point approximately equal to that of pure coconut oil but having a marked improvement over that of pure lard. Not all of the mixtures are useful as a butterfat substitute in frozen desserts, etc., because in order to have an effective butter fat substitute, it is necessary to have a predominance of fatty acid radicals of chain lengths of 16 or more. A mixture of 50% lard–50% coconut oil has been found to yield a product which will produce a good butter substitute even though the percentage of fatty acids is not as nearly identical to that of a mixture of approximately 70% lard and 30% coconut oil, the latter mixture being illustrated in Figure 1. The 50–50 mixture of lard and coconut oil also should be hydrogenated slightly to improve its stability.

EXAMPLE IV

A mixture of 19,928 pounds of dry lard and 8,542 of dry refined coconut oil was heated with agitation in a large open iron tank. When the temperature reached 140° F., 50 pounds of anhydrous sodium carbonate was added. When the temperature reached 160° F., 100 pounds of sodium methylate was added. Heating was continued until the mixture reached 180° F. Fifteen minutes after adding the catalyst, the mixture took on the characteristic reddish brown color indicative (in the case of lard) of crystal modification. The mixture was held at 180° F. for one hour and then cooled to 150° F. At this temperature water was sprayed lightly over the surface of the fat to inactivate the catalyst. A fine flocculent curd-like foots which formed during the addition of the water was allowed to settle. This "foots" was withdrawn after 1½ hours of settling. The refining loss was found to be 6½%. The oil was then water washed by stirring with about 15% water and allowing the water to settle out. The wash water was withdrawn from the bottom of the tank and the oil pumped to a bleaching kettle where it was heated to 200° F. and 100 lbs. of diatomaceous clay was added. The oil was then bleached by pumping through a plate and frame type filterpress.

In the presence of nickel catalyst, the bleached oil was then hydrogenated enough to reduce the refractive index 1.0 unit. The hardened oil was filtered to remove the catalyst and deodorized for 4 hours at 400° F. under vacuum. Just before cooling the oil, 0.1% citric acid was added and after the oil had cooled to 160° F., 0.1% butylated hydroxyanisole was added. These materials were added in order to stabilize the oil.

Analyses of samples of the oil taken during the test show:

| Sample | Softening Point (° F.) | Melting Point (° F.) | Iodine No. | Cloud (° C.) |
|---|---|---|---|---|
| Original mixture of 70% lard and 30% coconut oil. | 80 | 106 | | |
| Same after interesterification. | 79 | 91 | 51.2 | 18.2 in 16° bath. |
| After subsequent hardening from R.I. of 35.6 to 34.6. | 82 | 96 | 48.2 | 20.6 in 18° bath. |
| Final filled sample after deodorization. | 84 | 98 | 47.6 | |

The fat was bland, almost flavorless, and the chilled fat had an especially desirable "get away" characteristic in the mouth. The latter characteristic was particularly noticeable when the fat was formulated into a frozen dessert according to the following formula:

| | Percent |
|---|---|
| Fat | 6.10 |
| Non-fat milk solids | 12.50 |
| Sucrose | 11.50 |
| Corn syrup solids | 7.00 |
| Monoglycerides and gelatin | .55 |
| | 37.65 |

Commercial batches of frozen dessert were made with a fat content as high as 10.00%, and experimental batches were made from as low as 4% fat to as high as 16% fat. In all cases the frozen dessert had desirable flavor and "get away" characteristics.

EXAMPLE V 37,825 lbs. of lard having the following characteristics:

| | | |
|---|---|---|
| Cloud | ° C. | 20.6 |
| F.A.C. softening point | ° F. | 95 |
| F.A.C. melting point | ° F. | 109 |
| Iodine number | | 67.4 | was mixed with 16,210 lbs. of refined coconut oil. Analyses of the resulting mixture showed:

| | | |
|---|---|---|
| Softening point | ° F. | 81 |
| Melting point | ° F. | 105 |
| Iodine number | | 50.4 |

The mixture was heated to 180° F., and 0.19% soda ash and 0.28% sodium methoxide were added. At the end of 15 minutes, a characteristic brown color developed. A sample was withdrawn and the catalyst inactivated by the addition of water (to the sample). The batch was held at 180° F. for 2 hours with stirring and then cooled to 142° F. About 2% water was added to inactivate the catalyst. A flocculent "foots" formed, was allowed to settle and was withdrawn from the bottom of the tank. The refining loss was found to be 3.8%. The oil was then water washed and bleached. Anaylses of the 15 minute sample and the finished batch showed that interesterification was probably very nearly complete at the time of the taking of the 15 minute sample because there was no further significant change in softening and melting points.

| Sample | Softening Point (° F.) | Melting Point (° F.) |
|---|---|---|
| 15 minute | 86 | 93 |
| Final after refining and bleaching | 87 | 93 |

The bleached interesterified mixture was divided into two batches which were hydrogenated separately using nickel catalyst.

Batch 1, hardened from an R.I. of 35.2 to 34.4, and batch 2, hardened to an R.I. of 34.3, resulted in oils which had the following characteristics:

| | Softening Point (° F.) | Melting Point (° F.) | Iodine No. | Cloud (° C.) |
|---|---|---|---|---|
| Batch 1 | 85 | 96 | 47.4 | 20.0° in 17.5° bath. |
| Batch 2 | 82 | 96 | 46.6 | 20.0° in 17.0° bath. |

The oil was bleached and deodorized in a normal manner. Citric acid and propylgallate were added at the end of the deodorization period as the oil cooled in order to improve its oxidative stability. Analyses of the final fat showed:

| | | |
|---|---|---|
| F.A.C. melting point | ° F. | 97 |
| Iodine number | | 45.4 |

The fat was chilled through an internal chilling machine and filled into drums. Frozen dessert made using this fat as a replacement for butterfat was found to be very palatable and smooth having good "get away" characteristics in the mouth. It left no undesirable gumminess or undesirable flavors which are often associated with cottonseed and soybean oil substitutes for butterfat.

EXAMPLE VI 1917 pounds of prime steam lard was mixed with 783 pounds of refined coconut oil, and the mixture hardened 1.3 R.I. units, resulting in an oil with a melting point of 115° F. This was interesterified by heating and agitating at 212° F. for one hour with 10 pounds of sodium methylate. After cooling to 140° F. the catalyst was inactivated and the fat refined by the addition of water. Subsequently, the fat was water washed, deodorized and stabilized.

Analyses of samples taken during the above manufacturing procedure showed:

| Sample | Softening Point (° F.) | Melting Point (° F.) | Iodine No. |
|---|---|---|---|
| Mixture 70% lard and 30% coconut oil. | | 108 | 48.2 |
| Same hardened 1.3 R.I. units | 102 | 115 | 39.6 |
| Final hardened, interesterified and deodorized fat | 87 | 99 | 39.7 |

Margarine made from the fat had desirable butter-like characteristics.

EXAMPLE VII 2490 pounds of prime steam lard having the following characteristics:

| | | |
|---|---|---|
| F.F.A. | percent | 0.32 |
| Soft. pt. | ° F. | 101 |

| | | |
|---|---|---|
| Melt. pt. | °F__ | 114 |
| Iod. No. | | 61.4 |
| Titer | °C__ | 39.8 |
| Cloud | °C__ | 24.1 | was mixed with 1077 pounds of crude coconut oil having

| | | |
|---|---|---|
| F.F.A. | percent__ | 5.7 |
| Melt. pt. | °F__ | 75 |
| Iod. No. | | 10.4 |
| Titer | °C__ | 22.8 |
| Sap. No. | | 256.7 |

Analyses of the resulting mixture showed

| | | |
|---|---|---|
| F.F.A. | percent__ | 2.18 |
| Soft. pt. | °F__ | 98 |
| Melt. pt. | °F__ | 109 |
| Iod. No. | | 46.9 |
| Titer | °C__ | 30.9 |
| Cloud | °C__ | 19.7 |

The mixture was heated to 220° F. and simultaneously refined and interesterified by mixing in 1.9% of sodium methoxide dispersed in a slurry of a portion of the above mixture.

Agitation was continued for two hours while the temperature was maintained. The temperature was then reduced to 140° F. in order to facilitate settling of the "foots" which was formed upon the addition of about 2% water in the form of a fine spray. After settling, the foots portion was withdrawn. The oil was water washed and bleached by heating to 240° F. with 1% of bleaching clay and 0.25% filter aid, agitating vigorously, and filtering out the bleaching materials through a plate and frame press. Analyses of this newly created fat showed

| | | |
|---|---|---|
| Soft. pt. | °F__ | 80 |
| Melt. pt. | °F__ | 92 |
| Iod. No. | | 47.4 |
| Titer | °C__ | 31.6 |

The fat was then hardened using a nickel catalyst. Portions were withdrawn at intervals representing various R.I. drops. Each was filtered to remove the catalyst and deodorized. It was then used in manufacturing margarine according to the following formula:

| | Percent |
|---|---|
| Fat | 79.4 |
| Monoglyceride | 0.5 |
| Lecithin | 0.1 |
| Milk | 16.8 |
| Salt | 3.2 |

Margarine emulsions were prepared by slowly adding the fat plus monoglyceride and lecithin at a temperature of 105° F. to the salt-milk mixture which was 40° F. while constantly stirring. The final temperature of the entire mix was between 85 and 90° F. This was then rapidly chilled in an internal chilling machine and filled into cartons which were allowed to temper for 24 hours at 65° F. before determining the consistencies reported below.

Analyses of the various hardened fat and the margarine made therefrom showed:

| Sample | R.I. | Wiley Melting Pt. (°F.) | Consistency [1] of Margarine (75° F.) |
|---|---|---|---|
| New Fat | 33.9 | | |
| Partially hardened | 33.2 | | 36 |
| Do | 33.0 | 93.2 | 53 |
| Do | 32.2 | 98.2 | 103 |
| Do | 31.7 | 102.2 | 200+ |

[1] With 1" ring consistometer.

Examination by tasting the finished margarines indicated that intermediate hardening resulted in a product of the most desirable "get away" characteristics combined with the blandness necessary for the addition of butter flavor additives. The margarine had a short plastic range similar to butter and dissimilar to margarine as it is manufactured in current practice.

EXAMPLE VIII 22 lbs., 6 oz. lard
9 lbs., 9 oz. refined coconut oil
1 lb., 6 oz. tributyrin were mixed and heated to 100° C. for 3 hours in the presence of 2½ ounces sodium methylate. The catalyst was inactivated with water and, after removing the foots and water washing, the fat was hardened 1.0 R.I. units. The catalyst was removed and the resultant oil deodorized. Laboratory samples of margarine prepared from this fat were found to have fine flavor and non-greasy eating characteristics.

A filled cheese was made from a portion of the prepared fat according to the formula:

3½ lbs. fat
9½ lbs. skimmed milk

The ingredients were homogenized and combined with 87 lbs. of skimmed milk. The 100 lb. batch was then pasteurized at 145° F. for 30 minutes. This filled milk was then used as a raw material in the manufacture of Cheddar cheese in a normal manner. The cheese was held for 30 days and exhibited satisfactory flavor.

A processed cheese was made from another portion of the fat according to the following formula:

300 grams of fat
400 grams of water
300 grams of non-fat solids [1]

[1] Derived from sources such as skim milk cheese, cottage cheese part skimmed Cheddar and emulsifying salts.

The mixture was comminuted and pasteurized and filled into waxed containers which were stored at 45° F. for two months. The flavor developed was good, being quite similar to that of pasteurized process cheese.

EXAMPLE IX 2,130 grams of lard having

| | | |
|---|---|---|
| Softening point | °F__ | 93 |
| Melting point | °F__ | 112 |
| Iodine No. | | 66.5 |
| Linoleic acid | percent__ | 9.8 |
| Linolenic acid | do____ | 0.5 | and 870 grams of refined coconut oil having

| | | |
|---|---|---|
| Melting point | °F__ | 76 |
| Iodine No. | | 9.1 | were heated together to 100° C. at which temperature 30 grams of sodium methylate was added. Agitation was continued for 1 hour while the temperature was maintained at about 100° C. The mixture was cooled to 60° C. and refined by the addition of about 5% water. A foots formed which was allowed to settle. The interesterified fat was withdrawn, filtered and dried. The oil had the following characteristics:

| | | |
|---|---|---|
| Softening point | °F__ | 82 |
| Melting point | °F__ | 88 |
| Cloud point | °F__ | 70 |
| Iodine No. | | 47.8 |

The oil was transferred to a laboratory pressure vessel where it was hydrogenated under 30 pounds of hydrogen pressure at 200° C. in the presence of 0.2% of prepared nickel catalyst. In the course of the hydrogenation the refractive index (R.I.) read on a butyrol refractometer was reduced from 33.7 to 32.4. After cooling, the catalyst was removed by filtering. The filtered oil had the following physical characteristics:

| | | |
|---|---|---|
| Softening point | °F__ | 91 |
| Melting point | °F__ | 97 |

Cloud point _____ 82
Iodine No. _____ 40.9

The oil was then deodorized for 4 hours by bubbling water vapor through the oil at 200° C. under 1 mm. Hg pressure. At the end of the deodorization period, antioxidants were added to increase the fat's stability toward undesirable flavor development. The fat was then used as a butterfat replacement or substitute in ice cream (frozen dessert) and whipped cream.

To the portion tested as a whipped cream, three and one-half percent of commercial monoglyceride containing approximately 40% of the monoglyceride was added, and the mixture was flash-deodorized by heating to 200° C. under less than 1 mm. Hg pressure and immediately cooled while bubbling steam through the heater. This fat was analyzed and found to have:

Softening point _____° F__ 92
Melting point _____° F__ 98
Iodine No. _____ 41.3
Monoglyceride _____percent__ 1.8
Linoleic acid _____do____ 1.7
Linolenic acid _____do____ 0.0

Whipped cream was prepared according to the following formula from the above fat:

2 lbs., 12 oz. fat
8 oz. granulated sugar
12 oz. non-fat milk solids
4 lbs., 6 oz. water The above ingredients were heated to 160° F. and run twice through a high speed emulsifier and then immediately cooled to 70° F. The specific gravity of this whipped cream was 0.370. The flavor was bland, being somewhat preferred for its fresh sweetness over a sample of whipped cream.

EXAMPLE X

Fourteen hundred grams of lard and 600 grams of mixed coconut oil were heated together with 10 grams of sodium methylate for four hours at 90° C. The mixture was cooled and refined. It was then hydrogenated from a refractive index of 35.4 to 32.0. After filtering to remove the catalyst and deodorizing, the fat was used in coating some cookies. The coating fat was formulated according to the following formula:

500 grams fat
125 grams cocoa
500 grams XXXXXX Confectioner's Sugar
1.25 grams lecithin
30 grams non-fat milk solids The ingredients were heated to 115° F. and held at that temperature for 15 minutes with agitation at a low speed. At the end of the mixing period, cookies were dipped in the coating fat and then held at 75° F. for two hours. The coating fat was examined for evidence of fingerprints after handling, and none were found. The coating fat was not too soft to handle and had very good "getaway" characteristics in the mouth, there being no evidence of a fat coating on the roof of the mouth as is found in the inferior coating fats.

*Stir Down test*

The procedure for running the Stir Down test is as follows: A sample is heated to 65° C. and placed in a titer tube. The tube is then placed in a water bath maintained at a temperature of between zero and one ° C. The sample is stirred in the tube, and when the sample begins to cloud the temperature is read at ten second intervals. When the temperature of the sample begins to increase, stirring is discontinued, and the temperature is read until a maximum temperature is reached and again begins to fall. The minimum temperature before the temperature rise and the maximum temperature reached during the rise are recorded.

Obviously, many modifications and variations of the invention as hereinbefore set forth may be made without departing from the spirit and scope thereof, and therefore only such limitations should be imposed as are indicated in the appended claims.

I claim:
1. A substitute butterfat which comprises the interesterification product of a mixture of 50–75% lard and 50–25% coconut oil, the fatty acyl radicals of the mixture being randomly distributed among the glycerol radicals of said mixture.

2. The product of claim 1 wherein the mixture contains approximately 71% lard and 29% coconut oil.

3. The method for producing a substitute for butterfat which comprises interesterifying a mixture of 50–75% lard and 50–25% coconut oil at a temperature at which the triglycerides of said mixture are liquid and for a sufficient time to attain random redistribution of the fatty acids of the glyceride mixture.

4. The method of claim 3 wherein said mixture comprises approximately 71% lard and 29% coconut oil.

5. The method for producing a substitute for butterfat which comprises: mixing lard and coconut oil in proportions within the range of 50–75% lard and 50–25% coconut oil, incorporating therein a catalytic amount of alkali metal alcoholate, and heating said mixture to a temperature between the melting point of the glycerides of the mixture and 130° C. to effect a random redistribution of the fatty acids of the mixture.

6. The method of claim 5 wherein the catalyst is sodium methylate.

7. The method of producing a substitute for butterfat which comprises: interesterifying in the presence of an interesterification catalyst a mixture of 50–75% lard and 50–25% coconut oil at a temperature at which the triglycerides of said mixture are liquid; maintaining said mixture at said temperature in the presence of said interesterification catalyst for a sufficient time to attain random redistribution of the fatty acids of the glyceride mixture; and deactivating the catalyst before the mixture is cooled to avoid disturbance of the equilibrium attained.

References Cited in the file of this patent

UNITED STATES PATENTS

| | | |
|---|---|---|
| 262,207 | Cochran | Aug. 8, 1882 |
| 1,372,615 | Ellis | Mar. 22, 1921 |
| 1,505,560 | Grun | Aug. 19, 1924 |
| 1,547,571 | Ellis | July 28, 1925 |
| 2,442,532 | Eckey | June 1, 1948 |
| 2,442,538 | Abbott | June 1, 1948 |
| 2,726,158 | Cochran et al. | Dec. 6, 1955 |

FOREIGN PATENTS

| | | |
|---|---|---|
| 15,535 | Great Britain | 1898 |

UNITED STATES PATENT OFFICE
CERTIFICATE OF CORRECTION

Patent No. 2,892,721                                              June 30, 1959

De Witte Nelson

It is hereby certified that error appears in the printed specification of the above numbered patent requiring correction and that the said Letters Patent should read as corrected below.

Column 2, line 47, strike out "Less than 0.25% catalyst may be used but this results in an increased time of reaction.", and insert instead -- By employing temperatures between the point at which all the triglycerides remain liquid and about 130° C., a random redistribution of the fatty acids results in dispersing the short chain fatty acids --; line 56, same column, strike out "However, smaller amounts may also be used, but the employment of smaller amounts results in an increased time of reaction." and insert instead -- Less than 0.25% catalyst may be used but this results in an increased time of reaction. --.

Signed and sealed this 3rd day of November 1959.

(SEAL)

Attest:

KARL H. AXLINE                                           ROBERT C. WATSON
Attesting Officer                                        Commissioner of Patents